United States Patent
Dumarey

(10) Patent No.: US 9,185,846 B2
(45) Date of Patent: Nov. 17, 2015

(54) DOG FOR AN EJECTOR SYSTEM OF A SQUARE BALER

(75) Inventor: Robrecht Dumarey, Gistel (BE)

(73) Assignee: CNH Industrial America LLC, New Holland, PA (US)

( * ) Notice: Subject to any disclaimer, the term of this patent is extended or adjusted under 35 U.S.C. 154(b) by 217 days.

(21) Appl. No.: 13/500,361

(22) PCT Filed: Sep. 28, 2010

(86) PCT No.: PCT/EP2010/064303
§ 371 (c)(1),
(2), (4) Date: Jun. 1, 2012

(87) PCT Pub. No.: WO2011/042332
PCT Pub. Date: Apr. 14, 2011

(65) Prior Publication Data
US 2012/0266765 A1      Oct. 25, 2012

(30) Foreign Application Priority Data
Oct. 7, 2009   (BE) .................................. 2009/0610

(51) Int. Cl.
*B30B 15/32*     (2006.01)
*A01F 15/08*     (2006.01)

(52) U.S. Cl.
CPC ............. *A01F 15/0875* (2013.01); *Y10T 83/04* (2015.04)

(58) Field of Classification Search
CPC .......... A01F 2015/048; A01F 15/0875; B30B 9/3028
USPC .......... 100/7, 188 R, 218; 198/728, 732, 692, 198/693, 697; 414/24.5, 497, 501, 525.1, 414/525.2, 547; 144/242.1, 245.6, 250.21, 144/250.22, 250.23, 250.24, 250.25
See application file for complete search history.

(56) References Cited

U.S. PATENT DOCUMENTS

| | | | | |
|---|---|---|---|---|
| 314,523 | A * | 3/1885 | Duval | 100/218 |
| 491,201 | A * | 2/1893 | Werner et al. | 144/245.6 |
| 522,223 | A * | 7/1894 | Luther | 198/732 |
| 1,771,888 | A * | 7/1930 | Goff | 144/250.23 |
| 2,660,949 | A * | 12/1953 | Russell | 100/187 |
| 3,496,831 | A * | 2/1970 | Werner et al. | 409/139 |
| 4,791,865 | A * | 12/1988 | Naaktgeboren | 100/218 |
| 5,540,144 | A * | 7/1996 | Schrag et al. | 100/188 R |
| 2002/0046924 | A1* | 4/2002 | Woodham | 198/463.5 |
| 2005/0172838 | A1* | 8/2005 | Dubois | 100/218 |
| 2012/0179338 | A1* | 7/2012 | Dresher | 701/50 |
| 2013/0233187 | A1* | 9/2013 | De Rycke et al. | 100/188 R |
| 2013/0255512 | A1* | 10/2013 | Naeyaert | 100/191 |

FOREIGN PATENT DOCUMENTS

| | | | | |
|---|---|---|---|---|
| EP | 264497 A1 * | 4/1988 | | A01F 15/04 |
| EP | 810083 A2 * | 12/1997 | | B30B 9/30 |
| FR | 2700099 A1 * | 7/1994 | | A01F 15/04 |
| WO | WO 9629195 | * | 9/1996 | B30B 9/30 |

* cited by examiner

*Primary Examiner* — Jimmy T Nguyen
*Assistant Examiner* — Leonel Vasquez
(74) *Attorney, Agent, or Firm* — Patrick M. Sheldrake; Seyed V. Sharifi T.

(57) ABSTRACT

A dog is disclosed for mounting on a shuttle assembly of a bale ejector system of a square baler. The dog has two pointed ends and at least one mounting feature that permits the dog to be pivotably mounted on the shuttle assembly. The dog is symmetrical so as to be selectively capable of being mounted on the shuttle assembly in each of two orientations in order to extend the service life of the dog.

6 Claims, 1 Drawing Sheet

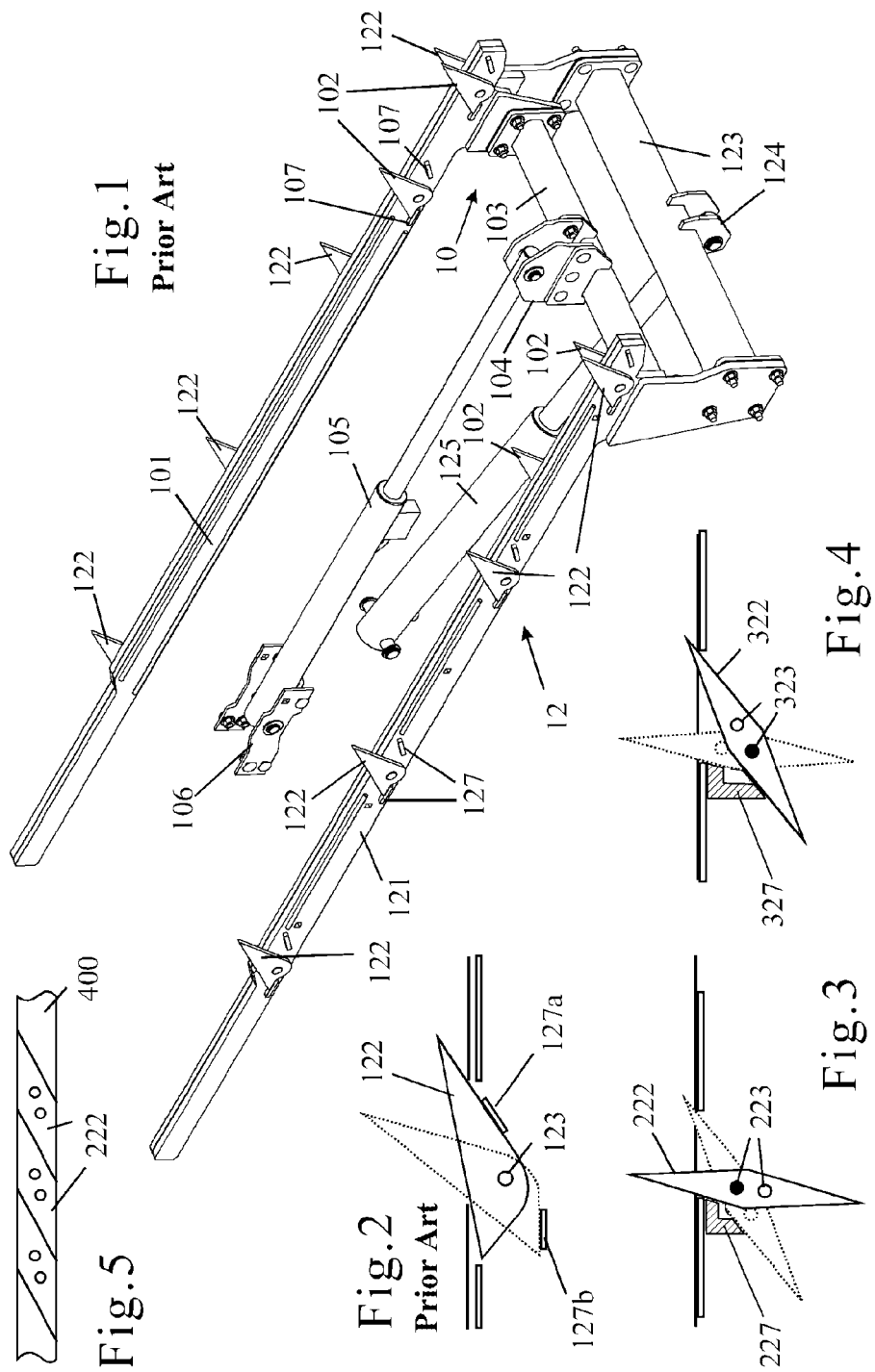

DOG FOR AN EJECTOR SYSTEM OF A SQUARE BALER

This application is the US National Stage filing of International Application Serial No. PCT/EP2010/064303 filed on Sep. 28, 2010 which claims priority to Belgium Application BE2009/0610 filed Oct. 7, 2009, each of which is incorporated herein by reference in its entirety.

TECHNICAL FIELD

The present invention relates dog for use in an ejector system of a square baler.

BACKGROUND ART

WO96/29195 discloses a square baler which, instead of using the compacting plunger to unload tied bales from the bale case, comprises an auxiliary ejector system to enable the operator to off-load completed bales. The ejector system comprises a shuttle assembly housed within hollow rails of the bale case. The shuttle assembly consists of a frame that is reciprocated in the direction of movement of the compacting plunger and has dogs projecting upwards from it to engage in the underside of the bales. The dogs grip the bale only during the forward stroke of the shuttle assembly, that is to say when it is moving towards the discharge outlet of the bale case, and slip relative to the underside of the bale during the return stroke. In this way, the reciprocation of the shuttle assembly incrementally advances the bales towards the discharge outlet.

The ejector mechanism of WO96/29195 is controllable to enable the operator to select whether to discharge only the last bale in the bale case (the one nearest the discharge outlet) or both the last bale and the one before it. To achieve this, the dogs are arranged on the shuttle in a longitudinally extending series and at least some of the dogs are controllable by the operator using a selector assembly so that the controlled dogs may be positioned either to extend into the bale case or to be retracted from it.

Apart from the complexity resulting from the need to control dogs individually, the ejector system of WO96/29195 suffers from the disadvantage that the operator needs first to inspect the position of the bales in the bale case in order to decide on which of the dogs to activate.

To avoid these disadvantages, the Applicants' earlier patent application number EP 08154199.7 discloses a square baler having a bale case within which crop is compacted by means of a plunger, a discharge outlet at one end of the bale case and an ejector system for advancing bales towards the discharge outlet independently of the movement of the compacting plunger. The ejector system comprises a shuttle assembly mounted in a wall of the bale case for reciprocation parallel to the direction of movement of the bales in the bale case, and at least one dog mounted on the shuttle assembly to engage in the last bale in the bale case positioned nearest the discharge outlet and to advance the bale incrementally out of the discharge outlet in response to reciprocation of the shuttle assembly. A second shuttle assembly is mounted in a wall of the bale case for reciprocation independently of the first shuttle assembly, the second shuttle assembly having at least one dog mounted thereon to engage in the next-to-last bale in the bale case.

In one embodiment, the second shuttle assembly has a series of dogs staggered over its entire length and is capable of advancing bales as far as the discharge outlet of the bale case. In this case, reciprocation of the second shuttle assembly on its own will suffice to advance both the last bale and the next-to-last bale to the discharge outlet.

In an alternative embodiment, the second shuttle assembly is designed to move the next-to-last bale only as far as a position where it will be taken up by the first shuttle assembly. In this case, both shuttles need to be reciprocated to discharge the next-to-last bale in the bale case.

Without regard to the exact positions of the completed bales in the bale case, the operator may thus elect to discharge only the last bale by operating the first of the shuttle assemblies or to discharge both the last and next-to-last bale by reciprocating the second shuttle assembly either on its own or in conjunction with the first shuttle assembly.

An important advantage of EP 08154199.7 is that the dogs do not need to be controlled, i.e. selectively enabled and disabled. Each dog is instead pivotably mounted on the shuttle assembly and designed to act in a manner analogous to the pawl of a pawl and ratchet. Thus, each dog will pivot into an extended gripping position during the forward movements of the shuttle to advance the bale towards the discharge outlet and will retract during reverse movements of the shuttle assembly to slip relative to the bale.

When using pivotable dogs, they may be biased into their extended position by gravity or by means of a spring. EP 08154199.7 also teaches that the dogs may be designed to protrude slightly into the bale case when retracted so that they will be raised automatically into their extended position as they grip into a bale.

The present invention seeks to improve on the design of the dogs used in the reciprocating ejector assemblies such as for example known from EP 08154199.7.

Each dog in EP 08154199.7 comprises a generally triangular plate that is pivoted in such a manner that its own weight rotates it into a retracted rest position in which its side lies nearly level with the floor of the bale case. The small part of the dog that projects above the floor digs into the bale when the shuttle assembly is moved towards the discharge outlet of the baler and the resistance that it encounters rotates the dog into its raised position. The bale is now gripped and moves with the shuttle assembly. During the movement of the shuttle away in the opposite direction, the dog returns to the rest position in which it is retracted and no long grips the bale. Two stops are provided against which the dog rests in its retracted and extended position, respectively.

DISCLOSURE OF INVENTION

Several problems arise with dogs constructed in the manner taught in EP 08154199.7. First, as a significant force is required to move bales, the dogs are subjected to considerable wear and require frequent replacement.

With a view to mitigating this first disadvantage, the present invention provides a dog for mounting on a shuttle assembly of a bale ejector system of a square baler, the dog having two pointed ends and at least one mounting feature that permits the dog to be pivotably mounted on the shuttle assembly, the dog being symmetrical so as to be selectively capable of being mounted on the shuttle assembly in each of two orientations.

By virtue of the symmetry of the dog, when one of its pointed ends is worn, the dog can simply be reversed instead of being replaced thereby doubling its useful life.

If the dog is spring biased, it will only require a single central mounting feature, which may be a pivot pin but is preferably simply a round hole to fit over a projecting pin to act as a pivot. However, it is preferred for the dog to be biased by gravity in which case it may be provided with two mounting features disposed on opposite sides of its centre of gravity. In this way, if it is preferred to bias the dog in its extended position, the centre of gravity can be chosen to be below the pivot point in both orientations of the pin. If it alternatively is preferred to bias the dog in its retracted position, the centre of gravity can be chosen to be below the pivot point in both orientations of the pin.

A second problem encountered in EP 08154199.7 is that crop can snag on the stops preventing the dog from returning to its retracted position or moving to its fully extended position.

Because the dog now has edges that extend both above and below the mounting feature, it is possible in a preferred embodiment of the present invention to provide stops on only one side of the dog to define the limits of its rotation in both directions.

By moving one of the stops, preferably the stop against which the dog rests in its retracted position from one side of the dog to the other, the preferred embodiment of the invention reduces the risk of trapped crop preventing the dog from moving to the retracted position.

A single stop, having regions for engaging edges of the dogs lying both above and below its pivot point, may conveniently be used to limit rotation of the dog in both directions.

A third disadvantage arises in EP 08154199.7 because the rest position of the dog is chosen to be the retracted position. When the shuttle assembly starts to move, it may take some time before the projecting tip of the dog catches in the crop material so that the shuttle assembly merely slips relative to the bale. This slippage can create a groove in the bale which may render further attempts at gripping the bale futile.

It is therefore preferred in the present invention to mount the dog in such a manner that it is biased, whether by its own weight or otherwise, into the extended position. This ensures that the dog will immediately grip the bale when the shuttle is moved towards the discharge outlet of the baler.

According to a second aspect of the invention there is provided a method for manufacturing the dog according to the first aspect of the invention, characterised in that the dog is stamped or cut out of a continuous strip. In this way the pin can be manufactured economically with minimal material wastage.

BRIEF DESCRIPTION OF DRAWINGS

The invention will now be described further, by way of example, with reference to the accompanying drawing, in which:

FIG. 1 is the single drawing of EP 08154199.7 and will be described below to explain the background of the present invention, FIG. 2 is a side view of one of the dogs shown in FIG. 1, FIG. 3 is a similar view to FIG. 2 but shows the preferred embodiment of the present invention, FIG. 4 is similar view to FIGS. 2 and 3 showing an alternative embodiment of the invention, and FIG. 5 shows how the dogs of the invention may be manufactured from a strip with a minimum of material wastage.

MODE(S) FOR CARRYING OUT THE INVENTION

The integration of an ejector system into a square baler is well documented in the prior art. WO96/29195 comprises several drawings depicting the manner in which that ejector system is mounted in the baler. In the interest of simplicity, the following description will concentrate on the construction of the ejector system and will only describe the bale case to the extent necessary for an understanding of the invention.

To ensure that it has sufficient rigidity, the floor of the bale case is not formed as a continuous flat surface. The floor can be formed of sheet metal that is bent to provide longitudinally extending channels or it can be formed of separate square section tubes that are welded to cross bars at their ends leaving open grooves between the individual tubes. The shuttle assemblies of ejector systems are designed to sit in such longitudinal grooves, channels or open rails with only their dogs capable of extending upwards above the floor surface on which the bales are supported.

The ejector system in FIG. 1 comprises two shuttle assemblies 10, 12 arranged one inside the other and are designed to share the same longitudinal grooves or rails in the floor of a bale case.

The first 10 and inner of the two shuttle assemblies comprises two longitudinally extending vertical bars 101 each of which carries on the inner side of its leading end nearest the discharge outlet of the baler two pivotable dogs 102. The number of dogs mounted near the leading end of the inner shuttle assembly is not critical, in as much as a single dog could suffice or one could use more than two dogs, provided that they can only grip the last of the bales in the bale case.

The two bars 101 are connected to one another by a cross bar 103 that lies under the floor of the bale case. A bracket 104 connects the cross bar 103 to a hydraulic cylinder 105, which lies in a channel of the floor and is attached by brackets 106 at its other end to the sides of that channel.

The outer of the two shuttle assemblies 12 comprises two longitudinally extending vertical bars 121 which lie immediately adjacent and back to back with the bars 101 of the first shuttle assembly. Each of these bars 121 carries on its outer side a series of dogs 122. The two bars 121 are connected to one another by a cross bar 123 which lies further below the floor of the bale case than the cross bar 103 of the first shuttle assembly. A bracket 124 connects the cross bar 123 to a hydraulic cylinder 125, which in this case lies entirely beneath the floor of the bale case. The other end of the hydraulic cylinder 125 is connected to a bracket (not shown) that projects downwards from the underside of the floor of the bale case.

The primary purpose of the described design of the two shuttle assemblies is to allow each of the two assemblies to be reciprocated without interfering with the other. The design is also intended to reduce the extent to which the hydraulic cylinders 105, 125 protrude from the underside of the floor of the bale case, this being achieved by housing one of the cylinders 105 within the depth of the floor itself.

The positioning of the ejector system is such that the dogs 102 of the first shuttle assembly 10 can only engage in the last bale in the bale case. When the cylinder 105 is fully retracted, the dogs 102 furthest from the discharge outlet engage near the leading edge (the one nearest the discharge outlet) of the last bale. When the cylinder 105 is fully extended, the dogs 102 nearest the discharge outlet engage near the trailing edge of the last bale. The leading edge of the bale will by then have been advanced onto the exit chute of the baler.

Thus by reciprocating the inner shuttle assembly 10 on its own, the last bale and only the last bale within the bale case will be ejected, provided that its leading edge has reached a position in which it can be gripped by one of the dogs 102 of the first shuttle assembly.

The second shuttle assembly 12 has dogs 122 that can also displace the last bale towards the discharge outlet. However, in contrast to the first shuttle assembly 10, the second shuttle assembly 12 has dogs that reach as far back as the next-to-last bale in the bale case. Consequently, reciprocation of the second shuttle assembly by the cylinder 125 will eject the last and next-to-last bales.

Each dog 102, 122 is designed to act as a barbed pawl. Each dog, such as the dog 122 shown in FIG. 2, is triangular in shape and is pivotably mounted on its associated bar at a point offset from its centre of gravity so that the natural tendency of the dog is to pivot clockwise (as viewed) into a retracted position. Small stops 127a and 127b adjacent each dog act as abutments to limit in both directions the arc through which the dog 122 can pivot. In the clockwise direction, the dog abuts the stop 127a when in a position in which it will slightly protrude above the floor of the bale case into the volume swept by the bales. In the anticlockwise direction, the dog is stopped by the stop 127b in a near vertical position to maximise its extension and its grip on the bale.

The present invention is concerned with the design of the dogs 102, 122 and proposes an alternative construction shown in FIGS. 3 and 4.

The dog 222 shown in FIG. 3, instead of being triangular has a shape resembling a compass needle, that is to say it is a rhombus in which the longer axis is much larger than the shorter axis. The dog 222 is thus rotationally symmetrical about its centre of gravity. Two holes 223 are provided in the dog which are symmetrically disposed about the centre of gravity of the dog. The holes 223 serving as mounting features to allow the dog to be pivotably mounted on a projecting pivot pin. A single stop 227 is provided which abuts the edge of the dog in both its end positions.

In FIG. 3, the dog 222 is pivoted about the upper of the two holes 223 and its centre of gravity thus hangs below its pivot point to bias it into the raised or extended position shown in a solid line.

The above construction of the dog offers several advantages over the dog 122 shown in FIG. 2 and taught by EP 08154199.7.

First, the symmetry of the dog 222 allows it to be reversed. Thus when one end of the dog is worn, it only needs to be reversed instead of being replaced. This effectively doubles the useful lifetime of the dog.

Second, the absence of a stop on one side of the dog 222, preferably the side to which the dog retracts, reduces the risk of crop being trapped against the stop and preventing the dog from retracting correctly during return movements of the shuttle assembly.

Third, the dog 222 is biased by its own weight into the extended position (shown in a solid line) instead of the retracted position (shown in a dotted line). This is preferred because it ensure that the bale is properly gripped as soon as a shuttle assembly commences its stroke.

It is not however essential for the dog to be biased into the extended position and it may, as in the case of the dog shown in FIG. 2, be biased into the retracted position. Such an embodiment is shown in FIG. 4 where the construction of the dog 322 is identical with that of the dog 222 in FIG. 3 and the only change is in the position of the position of the pivot pin and the shape of the stop 327 on the shuttle assembly. Here, the dog 322 pivots about the lower rather than the higher of the two holes 323 and as its centre of gravity is above its pivot point, it tends to topple into the retracted position (shown again in a solid line). The dog 322 can nevertheless still function in the same manner as the dog 122 of FIG. 2 while offering the advantages of increased life and reduced risk of snagging on trapped crop.

An advantage of the symmetrical shape of the dogs 222 and 322 is that they can be manufactured economically. FIG. 5 shows how the dogs 222 can be cut or stamped out of a continuous strip 400 with a minimum of material wastage.

It is clear that the dogs according to the invention are not only suited for use with the bale ejector system according to EP08154199.7, but that they can also replace the dogs of alternative bale ejector systems such as for example known from EP0814951.

What is claimed is:

1. A dog for mounting on a shuttle assembly of a bale ejector system of a square baler, the dog comprising:
   a body having two pointed ends;
   at least one mounting feature with two pivotal connection points on the body wherein the body is configured for pivotal mounting around a pivot point on the shuttle assembly, wherein the body is symmetrical with respect to a center of gravity of the body such that the body is configured to be selectively mounted on the shuttle assembly in at least two orientations wherein in a first orientation a first pointed end of the two pointed ends is located above a second pointed end of the two pointed ends and and configured to engaged in the bale formed in the bale case of the square baler and in a second orientation the second pointed end of the two pointed ends is oriented above the first pointed end, and configured to engage in the bale formed in the bale case of the square baler.

2. A dog as claimed in claim 1, wherein the at least one mounting feature comprises two mounting features disposed on opposing sides of the centre of gravity of the body.

3. A dog assembly comprising,
   a body having two pointed ends for engaging a bale;
   at least one mounting feature with two pivotal connection points on the body configured for pivotally mounting the body to a shuttle assembly around a pivot point on the shuttle assembly, wherein the body is symmetrical with respect to a center of gravity of the body;
   the at least one mounting feature configured to selectively mount the body to the shuttle assembly at one of the two pivotal connection points on the body; and
   abutment surfaces that define the limits of rotation of the body in both directions wherein the abutment surfaces are positioned on the same side of the dog.

4. A dog as claimed in claim 3, wherein the abutment surfaces are formed from a stop having a portion that extends from a position above the pivot point of the dog to a position below the pivot point of the dog.

5. A dog as claimed in claim 1, wherein the dog is mounted to a bar of the shuttle assembly such that it is biased into the extended position as to grip into the bale when the shuttle assembly is moved towards a discharge outlet of the square baler.

6. A dog for mounting on a shuttle assembly of a bale ejector system of a square baler, the dog comprising:
   a body having a first pointed end, a second pointed end;
   at least one mounting feature with two pivotal connection points on the body configured for pivotal mounting around a pivot point on the shuttle assembly at one of the two pivotal connection points on the body whereby the body when pivoted to a first position is positioned to engage in a bale formed in a bale case of the square baler, wherein a first bale contacting portion at the first pointed end of the body located above the at least one mounting feature is symmetrical with respect to a center of gravity of the body to a second bale contact portion at the second pointed end of the body below the at least one mounting feature and that body is shaped and configured for being mounted on the shuttle assembly in at least two orientations.

* * * * *